Patented Mar. 27, 1951

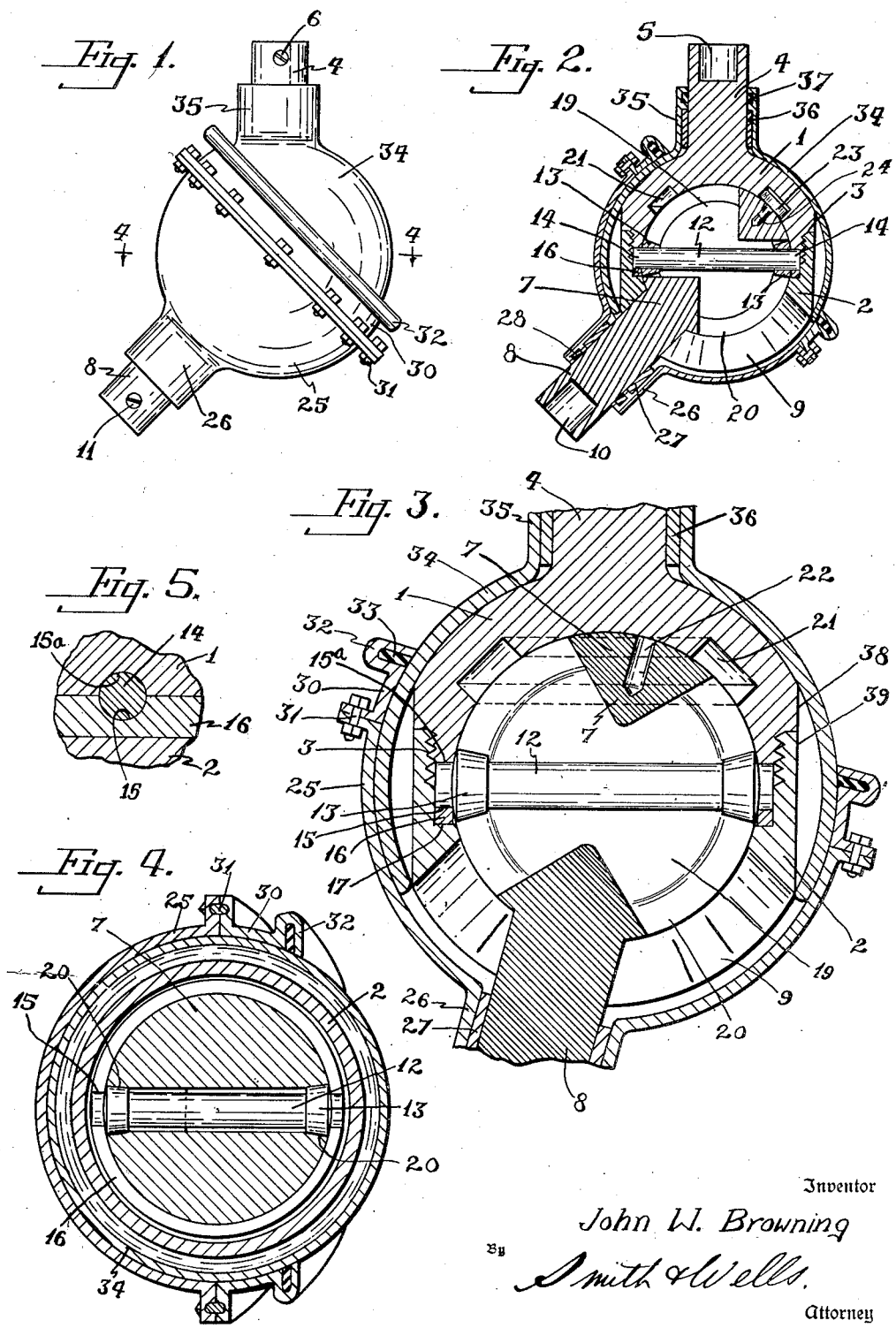

2,546,298

UNITED STATES PATENT OFFICE 2,546,298

HIGH-SPEED FLEXIBLE JOINT

John W. Browning, Havre, Mont., assignor of two per cent to Edwin Obie and Ann Y. Obie, both of Bozeman, Mont.

Application October 27, 1947, Serial No. 782,307

5 Claims. (Cl. 64—7)

1

My present invention relates to the general class of joints or couplings for shaft sections or rod sections, and more specifically to an improved high speed flexible joint of the ball and socket type, which, while adapted for various uses, is especially designed for installation between shaft sections in transmitting power and motion from a driving shaft to a driven shaft. Means are provided whereby the flexible coupling or joint may be utilized in the nature of a universal coupling or joint and thus adapted to transmit power at various angles; and convertible means are also employed as component parts of the coupling whereby the flexing of the joint may be limited to a predetermined angle, as for instance the members of the joint may be arranged and maintained at a forty-five degree angle.

The primary object of the invention is the provision of a completely shielded ball and socket coupling that is composed of a minimum number of parts that may with facility be manufactured at low cost of production, and assembled with convenience between shaft sections to insure a safe, smoothly operating and efficient universal coupling that is durable and inexpensive in servicing and maintenance.

The invention consists in certain novel features of construction and combination and arrangements of parts, as will hereinafter be described and more specifically set forth in the appended claims.

In the accompanying drawings I have illustrated a complete example of a physical embodiment of my invention in which the parts are combined and arranged in accord with one mode I have devised for the practical application of the principles of my invention. It will, however, be understood that changes and alterations are contemplated and may be made in these exemplifying drawings and mechanical structures, as is evidenced by the disclosure of a modified form of the invention in the drawings, within the scope of my claims, without departing from the principles of the invention.

Figure 1 is an exterior view of a flexible joint in which my invention is embodied;

Figure 2 is a sectional view of the joint provided with means for limiting the angularity of the joint members;

Figure 3 is an enlarged sectional view of the flexible joint, with the parts arranged for use as a universal coupling adapted to operate at various angles;

Figure 4 is an enlarged sectional view at line 4—4 of Fig. 1, showing especially the coupling pin arrangement between the ball and socket members of the joint; and Figure 5 is a fragmentary sectional view illustrating the coupling pin mounting.

In carrying out my invention, the hollow sphere forming the socket member of the coupling or joint is preferably composed of two hollow hemispherical sections 1 and 2 that are provided with complementary flanges and threaded together at the joint 3. The section 1 is provided with an integral shank 4, having an attaching socket 5 for securing the end of a shaft section in the attaching socket by a set screw 6.

A round head or spherical ball 7 of slightly less diameter than the interior diameter of the socket member is also provided with an integral shank 8 that passes through a round or circular opening 9 in the wall of the section 2, and has an attaching socket 10. This socket has a set screw 11 for securing a shaft therein.

The relatively movable ball 7 and socket member are coupled together by means of a diametrically arranged pin 12 that is rigidly mounted in the socket member, and has a pair of spaced and inwardly tapered bearing rollers 13, 13, inset from the opposite ends 14, 14 of the pin. For securing these ends in the socket member they are clamped in semi-circular seats 15 formed in the upper face of a ring 16 that is seated on an annular shoulder 17 of the section 2, and seats 15a formed in the annular free face of the flange of section 1 of the socket member. When the sections 1 and 2 are being screwed together, the ring 16 can rotate with the section 1 until the parts are drawn together.

To accommodate the coupling pin 12 and permit relative movement of the ball and socket members, the ball is provided with an interior slot 19 wide enough for the pin 12 that spreads outwardly to the diametrically opposite surfaces of the ball, and the walls of the slot 19 at the outer periphery of the ball are formed with a pair of opposed sets of beveled bearing tracks or faces 20, 20, of arcuate shape over which the rollers 13, 13 may roll in flexing the joint.

In Fig. 3 the arrangement and relation of the ball and socket members permit flexing of the joint at various angles, while in Fig. 2 the shanks 8 and 4 of the ball and socket are maintained at a forty-five degree angle by the use of co-acting elements of the ball and socket members.

For this predetermined angularity of the joint members the inner wall of section 1 of the socket is provided with an annular groove 21, and the ball is provided with a radial bearing socket 22, as best seen in Fig. 3. In Fig. 2 a head 23 is mounted in the groove 21 and the stem 24 of the head 23 is journaled in the bearing socket 22 in order that the head 23 may travel in the groove and retain the joint members at the predetermined angle shown in Fig. 2.

For lubrication of the interior operating parts of the flexible joint a supply of grease or oil is retained within the joint. A jacket or casing in the form of a hollow sphere is mounted to enclose the socket member. The jacket includes a hemi-spherical flanged cup 25 having an integral radially extending bearing sleeve 26 that encloses a bearing ring 27 on shank 8, and a packing or gasket 28 surrounding the exterior of the shank closes the free end of the sleeve.

The jacket also includes a flanged ring 30 that is bolted at 31 to the flanged cup 25, and the free edge of the ring is formed with an annular bead 32 having an interior groove for sealing material 33. A second cup 34 cooperates with the cup 25 and the ring 30 to completely enclose the ball and socket. This cup 34 has a sleeve 35 enclosing a bearing ring 36 on the shank 4. A gasket 37 is provided in the sleeve 35. The sections 1 and 2 are cut to cylindrical shape on their exterior surfaces, as indicated at 38 and 39, so that the cup 34 will pass over them in assembling the joint. By this arrangement and use of the jacket the rotating members of the joint are covered in all positions to which they may be flexed and, at the same time, the lubricant is retained within the joint or coupling against leakage.

In operation of the flexible joint there is slight clearance between the rollers and the tracks 20, so that a roller 13 is in bearing engagement with only one face at a time and is thus free to roll on the track. The head 23 can also roll along the wall of the groove 21. These features of the invention eliminate stiffness in the flexible joint and avoid excessive friction losses. The shell around the moving parts maintains the lubricant in place.

This application is a continuation in part of my application Serial No. 735,504, filed March 18, 1947, for High-Speed Flexible Joint, now abandoned.

Having thus fully described my invention, what I claim as new and desire to secure by Letters Patent is:

1. In a flexible shaft coupling, the combination with a ball having an interior slot and an exterior shank, an enclosing spherical socket having a circular opening for the shank, and an exterior shank on the socket member, of a coupling pin rigidly mounted in the socket-wall and extending through said slot, spaced bearing rollers journaled on the pin and opposed arcuate bearing faces on the ball for said rollers, and co-acting means on the ball and socket members to limit the relative angular movement of said members.

2. In a flexible shaft coupling, the combination with a ball having an interior slot and an exterior shank, an enclosing socket member having a circular opening for said shank, and an exterior shank on the socket member, of a coupling pin rigidly mounted in the socket wall and extending through said slot, spaced bearing rollers journaled on the pin and opposed arcuate bearing faces on the walls of the slot for said rollers, a head having a radially mounted journal bearing in the ball, and an annular groove in the inner face of the spherical socket for co-action with the head.

3. In a flexible shaft coupling, the combination with a ball having an interior slot and an exterior shank, an exterior sectional socket member having a threaded joint and a circular opening for said shank, and a clamp ring seated in the threaded joint, of a coupling pin having its ends clamped in seats of said ring and extending through said slot, and spaced bearing rollers journaled on the pin and opposed arcuate bearing faces in said slot for the rollers.

4. In a flexible shaft coupling, the combination with a ball having an interior slot and an exterior shank, an exterior sectional socket member having a threaded joint and a circular opening for said shank, and a clamp ring seated in the threaded joint, of a coupling pin having its ends clamped in seats of said ring and extending through the slot, spaced bearing rollers journaled on the pin and opposed bearing faces in said slot for the rollers, and co-acting means on the ball and socket members to limit relative movement of said members.

5. In a flexible shaft coupling, the combination with a ball having an interior slot and an exterior shank, an exterior sectional socket member having a threaded joint and a circular opening for said shank, and a clamp ring seated in said joint, of a coupling pin having its ends clamped in seats of said ring and extending through the slot, spaced bearing rollers journaled on the pin and opposed bearing faces in said slot for the rollers, said socket member having an anular interior groove, and a head journaled in the ball and movable in said groove.

JOHN W. BROWNING.

REFERENCES CITED

The following references are of record in the file of this patent:

UNITED STATES PATENTS

| Number | Name | Date |
| --- | --- | --- |
| 148,382 | Pitcher | Mar. 10, 1874 |
| 1,522,351 | Weiss | Jan. 6, 1925 |
| 2,074,703 | Nelson | Mar. 23, 1937 |
| 2,399,293 | Ransom | Apr. 30, 1946 |